Figure 1:
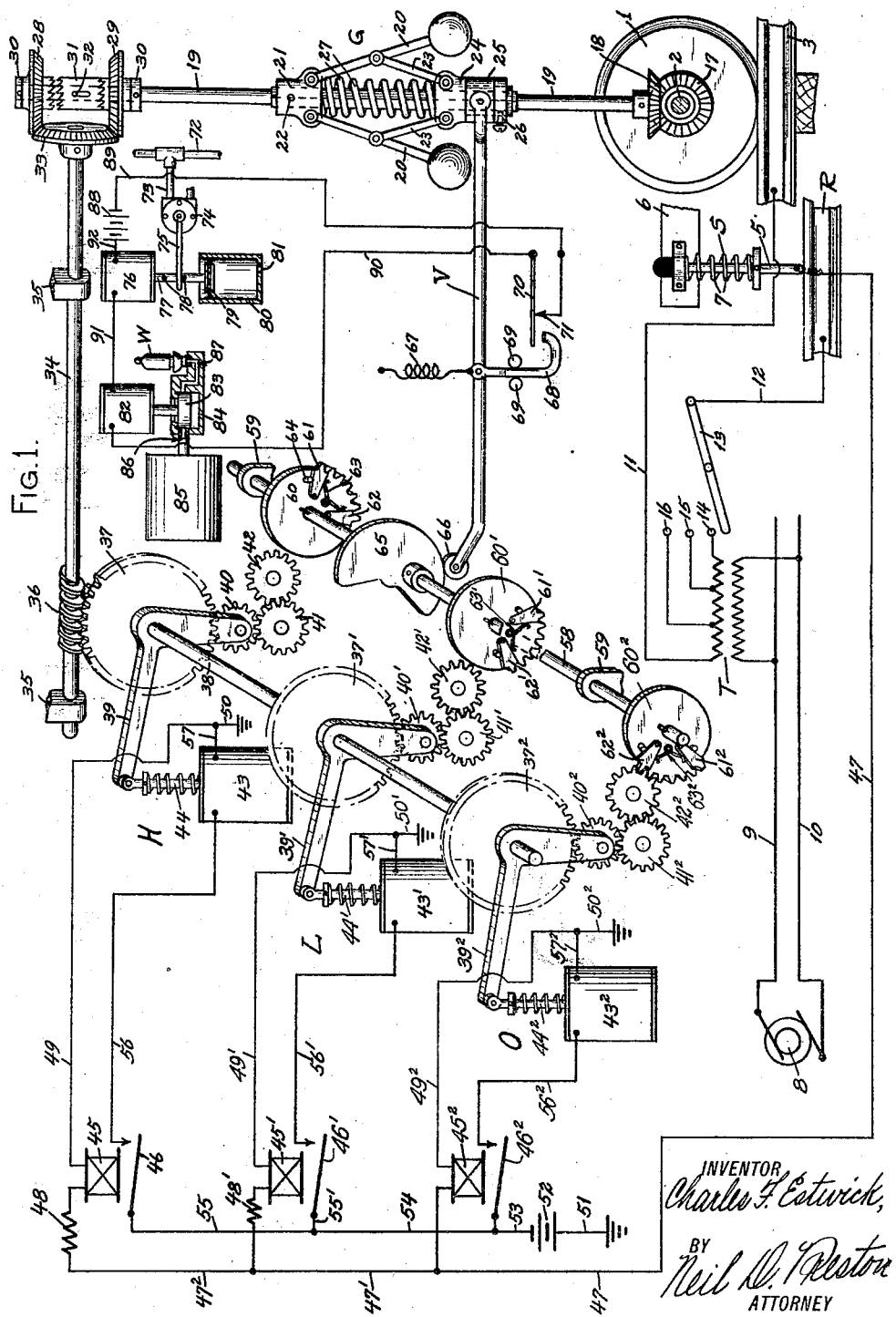

Aug. 5, 1924.

C. F. ESTWICK 1,504,185

AUTOMATIC SPEED CONTROL SYSTEM FOR RAILWAYS

Original Filed March 31, 1917     2 Sheets-Sheet 1

INVENTOR
Charles F. Estwick,
BY
Neil D. Preston
ATTORNEY

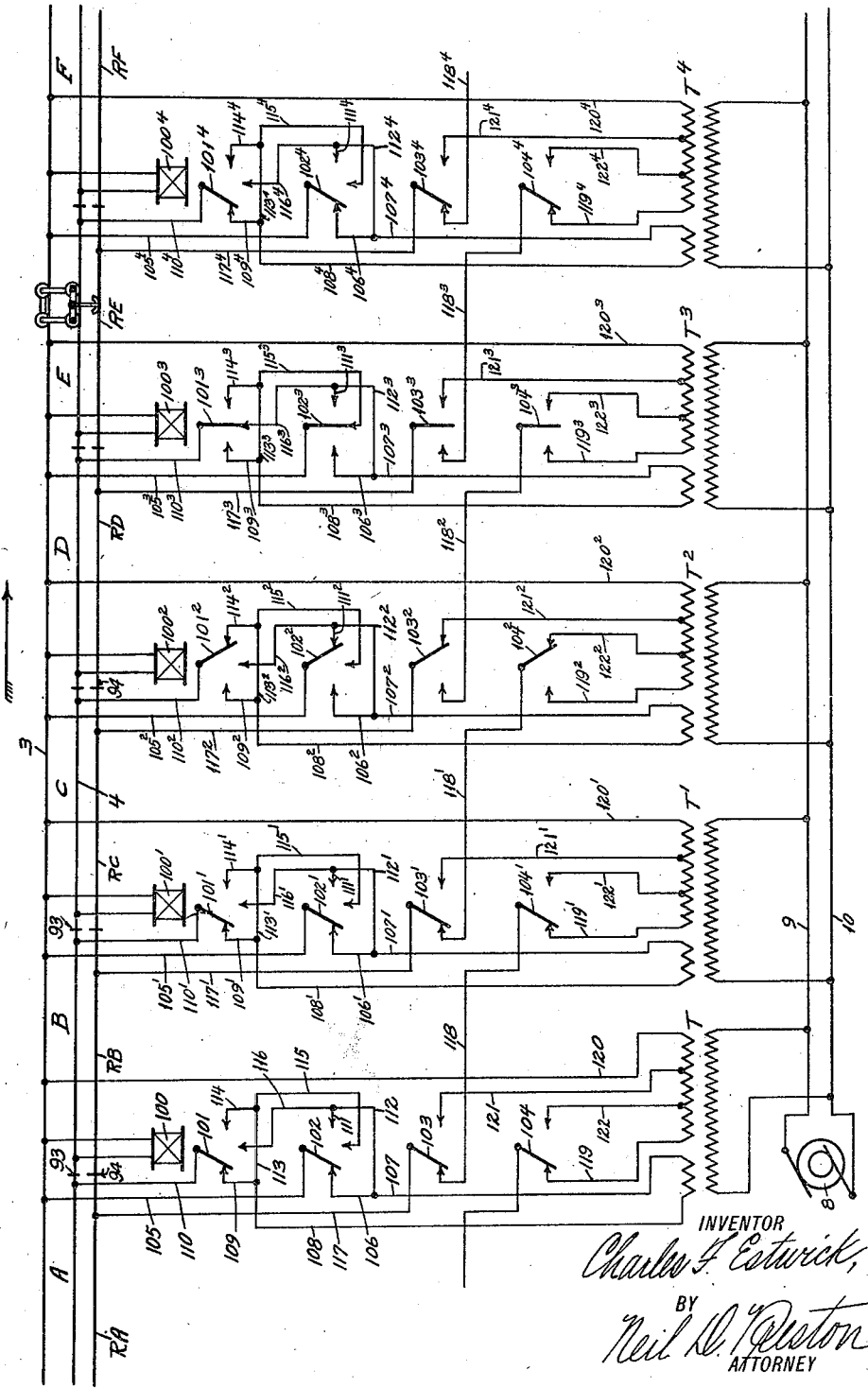

Patented Aug. 5, 1924.

1,504,185

UNITED STATES PATENT OFFICE.

CHARLES F. ESTWICK, OF ROCHESTER, NEW YORK, ASSIGNOR TO GENERAL RAILWAY SIGNAL COMPANY, OF GATES, NEW YORK, A CORPORATION OF NEW YORK.

AUTOMATIC SPEED-CONTROL SYSTEM FOR RAILWAYS.

Application filed March 31, 1917, Serial No. 158,822. Renewed December 29, 1922.

*To all whom it may concern:*

Be it known that I, CHARLES F. ESTWICK, a citizen of the United States, and resident of the city of Rochester, in the county of Monroe and State of New York, have invented a new and useful Automatic Speed-Control System for Railways, of which the following is a specification.

This invention relates to automatic train control systems, and more particularly to speed control systems in which the speed of a vehicle or train is automatically restricted to a predetermined speed at all points in its travel.

One of the principal objects of this invention is to devise a simple and efficient arrangement and construction of parts for imposing predetermined limitations on the speed of vehicles or trains at different points in their travel in accordance with the location and existence of dangerous conditions ahead of the train and in proximity thereto.

A further object of the invention is to obtain automatic regulation of the speed of a vehicle upon its approach to a dangerous condition or hazard which temporarily exists along the track, in such a manner that the advance or disappearance of the temporary hazard will permit the approaching vehicle to advance correspondingly without delay.

Other objects and advantages will appear more fully hereinafter in the description of the particular embodiment of the invention, selected to explain its principles, mode of operation, and preferred construction and arrangement of parts; and the novel features of invention will be pointed out in the appended claims.

In describing in detail the particular embodiment of the invention disclosed herein, reference is made to the accompanying drawings which form part of this specification, in which like reference characters refer to like parts in the several views, and in which—

Figure 1 is a diagrammatic view showing a simplified construction and arrangement of parts constituting the apparatus carried by the vehicle and suitable for carrying out this invention, the construction and relative location of parts illustrated in this figure being selected more with a view of making the principles and mode of operation of this invention easily understood, than with regard to the exact construction and location of parts used in practice; and Fig. 2 is a diagrammatic view showing one arrangement of trackway circuits suitable for use in connection with the train carried apparatus shown in Figure 1.

Referring to Fig. 1 of the accompanying drawing, in the simplified and diagrammatic illustration of the invention, only one wheel 1 of the vehicle has been illustrated, but it is to be understood that this wheel 1 is connected by an axle 2 to another wheel, and that this pair of wheels, together with all the other wheels supporting the vehicle, travels along the track rails of the track, one of the track rails 3 being shown in Fig. 1. In practicing this invention it is necessary to establish communication between certain appliances and devices along the track and other appliances and devices carried on the vehicle, and while this impulse transmitting means may take various forms, in the particular embodiment of the invention, illustrated, it is contemplated that a contact shoe S will be carried by the vehicle and so constructed and arranged as to make contact with contact rails or ramps R along the track. The simplified construction of the contact shoe S illustrated comprises a vertically movable plunger 5 which is carried by a bracket or arm 6 suitably fixed to frame or truck of the vehicles, and which for simplicity is assumed to be of some suitable insulating material, as wood. The plunger 5 is normally pressed downward by compression spring 7 which bears at one end against the guide of the plunger 5 secured to the bracket 6, and which bears at its other end against a collar fixed to said plunger.

In carrying out this invention it is proposed to use impulses of different controlling characteristics, and in the particular embodiment of the invention illustrated, these impulses consist of alternating current of different voltages applied to a partial circuit on the vehicle terminating at the contact shoe and the wheels and axles of the vehicle, although it is to be understood that direct current of different voltages may also be used; or the impulses may be caused to have different controlling characteristics in some other manner than by varying the voltage of the current supplied. The alternating current is preferably supplied from a single source, as a suitable generator 8, and transmitted along the railway over line wires 9 and 10. At the desired control points a transformer T is placed, and the primary of this transformer is connected across the line wires 9 and 10. In Fig. 1 no attempt has been made to illustrate any particular form of trackway circuits suitable for determining the voltage of the current to be supplied to the vehicle, since one arrangement of trackway circuits suitable for use with the car-carried apparatus, is shown in Fig. 2 and hereinafter described; and for simplicity a manual control is shown in Fig. 1. Referring to Fig. 1, one terminal of the secondary of the transformer T is connected by a conductor 11 to one of the track rails 3, and said secondary is provided with three different voltage taps, which terminate in contact buttons 14, 15 and 16. The ramp or contact rail R is connected by a conductor 12 to a switch 13 which may be moved into contact with any one of the contact buttons 14, 15 and 16. With the switch 13 in the position shown, it can be seen that there is no difference of potential between the ramp R and the track rail 3, and consequently no current is being supplied from the track to the vehicle. With the switch 13 in its lower position in contact with the button 14, the entire voltage of the secondary of the transformer T, which is conveniently termed high voltage, is applied across the ramp R and the track rail 3. With the switch 13 in its intermediate position in contact with the button 15, only part of the voltage of the secondary of the transformer T, which is termed medium voltage, is applied across the ramp R and the track rail 3. Similarly, with the switch 13 in its upper position, low voltage is applied across the ramp R and the track rail 3.

In carrying out this invention it is necessary to cause certain parts and devices on the vehicle to assume different positions or conditions according to the speed or rate of movement of the vehicle, and also according to the distance traveled by the vehicle from predetermined reference points. To accomplish this result, arrangement is made to establish an operative connection between the wheels of the vehicle and the apparatus thereon, so that the rate of rotation of the wheels may be used as a factor determining the speed of the vehicle, and the number of revolutions of the wheels from a given reference point may be used to determine the distance traveled by the vehicle from that reference point. In the particular embodiment of the invention illustrated, this operative connection comprises a beveled gear 17 which is fastened to the axle 2 and which meshes with a beveled gear 18 fixed to the lower end of a shaft 19 supported in suitable bearings (not shown).

The car-carried apparatus includes a suitable form of speed responsive device G capable of indicating or establishing, by the movement given to a part, the actual speed at which the vehicle is traveling at any instant. In the diagrammatic illustration of the invention shown in Fig. 1, this speed responsive device G comprises weighted arms 20 which are pivotally connected at their upper ends to a collar 21 fixed to the shaft 19, as by means of a pin 22. To an intermediate point of each weighted arm 20 is pivotally connected a link 23, and these links 23 are pivotally connected at their lower ends to a collar 24 which is mounted on a squared portion of the shaft 19 so as to turn therewith, but so as to be capable of sliding movement lengthwise thereof. The lower collar 24 is provided with a reduced portion on which is loosely mounted a sleeve 25, said sleeve being held in place by a ring 26 fixed to the collar 24 by a set screw. Pivotally connected to the sleeve 25 are the bifurcated ends of a floating lever V, the function and operation of which will be more fully explained hereinafter. Surrounding the shaft 19 between the fixed collar 21 and the sliding collar 24 of the speed responsive device G is a compression coil spring 27. The operation of the speed responsive device, being the same as that of the well known centrifugal ball governor, will be apparent to those skilled in the art without further explanation.

Near the upper end of the shaft 19 two beveled gears 28 and 29 are loosely mounted thereon and are held against endwise movement on said shaft away from each other by collars 30 pinned to said shaft. Between the beveled gears 28 and 29 is located a slidable clutch sleeve 31 which is connected by a pin and slot connection 32 to the shaft 19 so as to turn therewith, but so as to be capable of a sliding movement lengthwise of the shaft. The ends of the clutch sleeve 31 are formed with clutch teeth, facing in opposite directions, which are adapted to coact with the mating clutch teeth formed in the hubs of the beveled gears 28 and 29. Meshing with both of the beveled gears 28 and 29 is a beveled gear 33 which is fixed to a shaft 34 supported in suitable fixed bearings 35. The construction of the operating connection between the shaft 19 and the shaft 34 hereinbefore described, is illustrated as a simplified type of a device suitable for driving the shaft 34 in the same direction at all times irrespective of the direction of rotation of the shaft 19; and the operation of this simple mechanical movement will be readily apparent to those skilled in the art without further explanation.

Secured to the shaft 34 is a worm 36 which meshes with a gear 37 fastened in some suitable manner (not shown) to a shaft 38. Asscociated with the shaft 38 are a number of similar gearing combinations, the number of which may be varied to suit different conditions in accordance with the preference of the user. In the embodiment of the invention illustrated, three of these gearing combinations, H, L and O are shown, and since each of these gearing combinations is constructed the same, a description of one will suffice for all, and for convenience corresponding parts of these gearing combinations are given the same reference characters with distinctive exponents. Loosely mounted on the shaft 38, adjacent to the gear 37 of each gearing combination H. L or O, is an angle lever 39; and one arm of this angle lever carries at its outer end a gear 40 meshing with the gear 37. Adjacent to the gear 40 are two meshing gears 41 and 42 mounted for rotation on fixed bearing studs in a position with reference to the axis of the gear 37 and the diameter of the gear 40, such that the gear 40 may be shifted from one gear 41 to the other gear 42, or vice versa, and at the same time remain in mesh with the gear 37. By this arrangement and construction of parts, with the angle lever 39 in the position shown in Fig. 1, the gear 42 will be rotated in one direction, but if the angle lever 39 is shifted so as to bring the gear 40 directly into mesh with the gear 42, the direction of rotation of the latter gear 42 will be reversed.

The angle lever 39 is arranged to be operated by a solenoid 43, the core 44 of which is loosely and pivotally connected to said arm and is urged to an upper position by a suitable compression spring surrounding said core. Associated with each of the solenoids 43 is an alternating current relay 45 of well known or suitable construction, which is provided with an armature or contact finger 46 illustrated conventionally. The relays 45 of the several gearing combinations H, L and O are connected in parallel in a partial circuit terminating at the contact shoe S of the vehicle and a grounded connection leading to the frame and wheels of the vehicle; and in series with two of these relays 45, namely the relays of the combinatians H and L, are different resistances or impedances 48 and $48^1$. The complete partial circuit for energizing the relay 45 of the gearing combination H is as follows: commencing at the contact shoe S, conductors 47, $47^1$, $47^2$, resistance 48, relay 45 and conductors 49 and 50 to a suitable ground connection. The circuits for energizing the relays 45 of the other gearing combinations can be readily traced from analogy to the circuit already traced.

The resistance 48 associated with the relay 45 of the gearing combination H is so proportioned that it limits the flow of current through said relay to an amount insufficient to raise its contact finger 46 unless high voltage is applied to the ramp R with which the contact shoe S is in engagement. The resistance $48^1$ associated with the relay of the gearing combination L is less than the resistance 48, so that the relay $45^1$ will be sufficiently energized upon medium voltage to raise its armature, and the relay 45 of the gearing combination O, having no resistance in its circuit, is capable of being sufficiently energized when low voltage is applied to the contact shoe S. In this way, one, two or all of the three relays of the several gearing combinations may be energized to raise their respective contact fingers by varying the voltage applied to the contact shoe S.

When the armature 46 of the relay 45 is raised to its upper position, the solenoid 43 is energized by a circuit which may be traced as follows: commencing at ground at one end, conductors 51, battery 52, conductors 53, 54 and 55, armature 46 in its upper position, couductor 56, solenoid 43, and conductors 57 and 50 back to ground. In the same way, when the relays $45^1$ and $45^2$ are respectively energized sufficiently to raise their contact fingers, the solenoids $43^1$ and $43^2$ are also energized, the circuits associated with said solenoids being easily traced by analogy to the circuit already traced.

Extending parallel with the shaft 38 is a cam shaft 58 supported in suitable fixed bearings 59. Fixed to the cam shaft 58 are three mutilated gears 60, $60^1$ and $60^2$ which are disposed in the same plane as the gears 42, $42^1$ and $42^2$ of the three gearing combinations H, L and O, hereinbefore described. The portions of the peripheries of the three mutilated gears 60, $60^1$, and $60^2$ which are provided with teeth are arranged in different angular relations with reference to the shaft 58, as clearly shown in Fig. 1.

Pivotally mounted on the face of each mutilated gear 60, $60^1$, and $60^2$ are two pawls 61 and 62 which have ends shaped to conform with the teeth of the gear and which are urged apart into the position shown in Fig. 1 by leaf springs 63 against limiting stop pins 64 fixed to said mutilated gears. This construction is adopted so that after the gear 42 of any one gearing combination has moved its corresponding mutilated gear to one extreme, no further movement is given to the cam shaft 58 in that direction; but at the same time, an operative connection exists so that if the direction of rotation of the gear 42 should be changed, the mutilated gear could also be driven in the other direction to the other end of its range of movement. To illustrate, referring to the lower gearing combination O in Fig. 1, and assuming that the solenoid $43^2$ is deenergized so that the gear $40^2$ is in mesh with the gear $41^2$, the direction of rotation of the gear $42^2$ is clockwise and tends to move the cam shaft 58 in a counter-clockwise direction. When the cam shaft 58 has been driven in a counter-clockwise direction in this manner to the point where the last tooth of the mutilated gear $60^2$ engages with the teeth of the gear $42^2$, as shown in the drawing, the teeth of the latter gear $42^2$ successively engage with the upper pawl $62^2$ moving it downward against the opposition of its spring $63^2$ until said pawl may slip by the end of the particular tooth of the gear $42^2$ driving it, whereupon the pawl is restored by its spring back against its stop and into engagement with the next succeeding tooth of the gear $42^2$. Consequently, if the solenoid $43^2$ is energized so as to shift the gear $40^2$ into mesh with the gear $42^2$, the teeth of the latter gear $42^2$ will first cooperate with the pawl $62^2$ and then with the teeth of the mutilated gear $60^2$ and cause movement of the cam shaft 58 in a clockwise direction.

After the solenoid $43^2$ is energized to cause the cam shaft 58 to be driven part of a revolution in the clockwise direction, as hereinbefore explained, the pawl $62^1$ of the mutilated gear $60^1$ will be brought into engagement with the gear $42^1$, so that if the solenoid $43^1$ is energized and the gear $42^1$ rotating in a counter-clockwise direction, the cam shaft would be continued in its clockwise direction of rotation. In a similar way, if the solenoid 43 is energized, a still further clockwise movement of the cam shaft 58 would occur; and with all of the three solenoids 43 of the several gearing combinations energized, the cam shaft 58 would be turned in a clockwise direction from the position shown in Fig. 1 to another position in which the gear 42 had moved the mutilated gear 60 to its extreme. If, while this condition exists, the solenoid 43 is deenergized, the cam shaft 58 is driven in the opposite direction, namely, counter-clockwise, through an angle equal to the extent of the toothed portion of the mutilated gear 60, whereupon counter-clockwise rotation of the cam shaft 58 would cease and it would be held in this new position. If the solenoid $43^1$ is also deenergized, either at this time or subsequently, the cam shaft 58 is driven still further through another part of a revolution in a counter-clockwise direction; and in the same way when the solenoid $43^2$ is deenergized, the cam shaft 58 is driven still further in a counter-clockwise direction to the position shown in Fig. 1.

From the foregoing it can be seen that the cam shaft 58 may be caused to rotate through successive parts of a revolution by applying different voltages to the contact rails or ramps R, so as to cause a successive energization or deenergization of the solenoids 43 associated with the gearing combinations H, L, and O.

Fixed to the cam shaft 58 is a cam 65; and arranged to bear against the edge of this cam is a roller 66 carried by the end of the floating lever V. A tension spring 67 anchored at one end, is connected to an intermediate point of the floating lever V and serves to keep the roller 66 intimately in contact with the cam 65. Connected to an intermediate point of the floating lever V is a contact operating member 68, provided with suitable guides 69, which is arranged so as to separate a resilient contact spring 70 from a fixed contact point 71 when the intermediate point of the floating lever V has moved upward beyond a predetermined point.

According to the particular embodiment of the invention illustrated, it is contemplated that the control or regulation of the movement of the vehicle equipped with a train control system embodying this invention will be produced by the well known system of air brakes; and since the construction and operation of the parts of an air brake system is thoroughly familiar to those skilled in the art, no attempt has been made to illustrate an air brake system, except in so far as necessary to make it clear how the operation of the parts hereinbefore described causes an automatic application of the brakes. As will be clearly understood by those skilled in the art, an automatic application of the brakes is obtained when the train pipe or train line forming a part of the air brake system is vented. In the diagrammatic illustration of parts shown in Fig. 1, a portion 72 of the train pipe is illustrated, and this portion in communication by a pipe 73 with some suitable form of a valve 74, which is constructed and adapted so as to open communication from the pipe 73 to the atmosphere when the valve 74 is opened. The valve 74 is shown provided with an arm 75, and the arrangement and construction of parts contemplated is such that downward movement of the arm 75 from the position shown in Fig. 1 opens the valve 74. In order to cause an automatic opening of the brake valve 74, there is provided a brake solenoid 76 having a vertical movable core 77, in which are fixed pins 78 adapted to engage the arm 75. Associated with this core 77 is some suitable form of a time element or slow-acting device, which is shown as comprising a piston 79 secured to the end of the core 77 and having a flexible packing, said piston operating in a cylinder 80 having a restricted exhaust opening 81 in its lower end. The braking solenoid 76 is normally energized so that its associated parts are in the position shown in Fig. 1; but when said solenoid is deenergized, its core 77 moves downward due to its own weight gradually at a rate determined by the size of the exhaust opening 81 and the size and proportion of the other parts of the time element device. The time element device is so constructed and adjusted that following the deenergization of the solenoid 76 a predetermined short interval of time elapses before the upper pin 78 strikes the arm 75 and moves said arm down far enough to open the valve 74. In short, the parts described constitute an automatic timing mechanism which operates to produce an automatic application of the brakes at a predetermined time after the solenoid 76 is deenergized.

It is also contemplated according to this invention to make provision for giving the motorman or engineer of the train advance warning of the automatic application of the brakes, so that if the engineer or motorman acts promptly in obedience to this advance warning, he may control the train himself so as to avoid an automatic application of the brakes. While this advance warning may be given in different ways, according to the particular embodiment of the invention illustrated, an air whistle W is provided. The operation of this whistle W is controlled by a solenoid 82 which operates a valve 83 mounted in a suitable valve casing 84. The compressed air for sounding the whistle W may come from any suitable source, as a reservoir 85, and is conducted by a pipe 86 to the valve casing 84. The solenoid 82 is normally energized to cut off communication between the source of compressed air and the whistle W, but when said solenoid 82 is deenergized, the valve 83 moves under the influence of its own weight downward until communication is established from the valve casing 84 through a channel 87 to the whistle, whereupon the whistle W is sounded and continues to sound until the solenoid 82 is again energized.

The solenoid 82 controlling the warning signal W and the brake solenoid 76 are included in a normally closed circuit as follows: commencing at a suitable source of current, as a battery 88, conductor 89, contact point 71, contact spring 70, conductor 90, solenoid 82, conductor 91, solenoid 76, and conductor 92 back to the battery 88.

The shape of the cam 65 is determined with reference to the desired curve of permissive speed, and this curve of permissive speed is preferably determined with proper regard to the braking curve of the vehicle. In the particular type of cam illustrated, its radii correspond, according to some arbitrarily selected scale, to different permissive speeds; and the angular movement of said cam corresponds to the distance traveled. With the cam 65 in a given position, it can be seen that the actual speed of the vehicle cannot exceed a predetermined speed without causing the sounding of the warning whistle W and a subsequent automatic application of the brakes, because as the actual speed of the vehicle increases, the speed responsive device G causes an upward movement of the righthand end of the floating lever V, so that the intermediate point of said floating lever, to which the contact operating member 68 is attached, will be raised far enough to cause a separation of the contact spring 70 from the contact point 71, the roller 66 at the other end of said floating lever forming in effect a fixed fulcrum point. When the contact spring 70 is separated from the contact point 71, the circuit hereinbefore traced for normally energizing the solenoid 82 controlling the warning signal W and the brake solenoid 76 is broken, thereby causing the immediate sounding of the warning signal and also setting the time element device associated with the brake solenoid 76 into operation. If the engineer obeys the warning signal W and by shutting off the power and manually applying the brakes, reduces the speed of the vehicle, the speed responsive device G moves one end of the floating lever V downward quickly and faster than the other end of the floating lever is permitted to move upward by the cam 65, so that the contact operating member 68 moves down far enough to permit the contact spring 70 to touch the contact point 71, whereupon the circuit for energizing the solenoids 82 and 76 is again established. The reenergization of the solenoid 82 stops the sounding of the warning signal W, and the reenergization of the solenoid 76 moves the core 77 thereof back again to the upper position. The time element device associated with the brake solenoid 76 is adjusted with reference to the time required for the engineer to shut off the power and manually apply the brakes so as to cause a substantial reduction in speed, so that the action described will take place before the core 77 drops far enough to open the brake valve 74, providing the engineer acts promptly.

With this explanation, it can be seen that, with the cam 65 in any given position, there is a limiting speed which the vehicle may not exceed without having its warning signal W sounded, followed by a subsequent automatic application of the brakes if the engineer fails to apply the brakes himself; and by rotating the cam 65 in one direction or the other this limiting speed may be increased or decreased.

The parts of the car-carried apparatus shown in Fig. 1 are so arranged and constructed that when the contact shoe S of the vehicle is in contact with a ramp R to which high voltage is applied, the several solenoids 43 of the gearing combinations H, L and O are energized, as explained hereinbefore, and the cam shaft 58 and the cam 65 are moved to a position permitting the maximum safe speed desired. If the contact shoe S engages with a ramp R to which medium voltage is applied, the solenoid 43 of the gearing combination H is deenergized, thereby resulting in a counter-clockwise movement of the cam 65, as explained hereinbefore. The cam 65 is moved in a counter-clockwise direction gradually and exactly in accordance with the distance traveled by the vehicle, and this movement of said cam permits the roller 66 to move upward, due to the decreasing radii of said cam, so that the actual speed of the vehicle must be correspondingly decreased in order to prevent the contact operating member 68 being moved upward far enough to cause a sounding of the warning signal W and a subsequent automatic application of the brakes. If the contact shoe S engages with a ramp R to which low voltage is applied, the solenoid $43^1$ of the gearing combination L is deenergized, thereby resulting in a still further counter-clockwise movement of the cam 65, and this further movement requires the actual speed of the vehicle to be correspondingly further decreased. If the contact shoe S engages with a ramp R having no voltage applied thereto, a still further reduction in the speed of the vehicle is compelled. This final reduction in speed is preferably selected with a view of bringing the vehicle to a complete stop. When the voltage applied to the contact shoe S is increased, the cam shaft 58 is rotated in a clockwise direction gradually in accordance with the progress of the vehicle along the track so as to permit the vehicle to travel at gradually increased speeds. In general, the rate of deceleration due to braking is ordinarily greater than the rate of acceleration due to the propulsion power of the vehicle, so that the application of higher voltages to the contact shoe S permits the vehicle to accelerate without interference. In some cases the vehicle may pass several ramps R in succession to which the same voltage is applied, and in such a case the cam shaft 58 and the cam 65 will be held in the existing position automatically and the vehicle may continue at the same speed.

From the foregoing it can be seen that by changing the voltage applied to the ramps R, the vehicle may be compelled to gradually reduce its speed or may be permitted to gradually increase its speed, according to whether the voltage on the successive ramps decreases or increases.

One arrangement of trackway circuits suitable for controlling the voltage applied to the ramps R according to traffic conditions is illustrated in Fig. 2. Referring to Fig. 2, the usual track rails of the track are indicated by the numerals 3 and 4. One of these track rails, 4, is divided by insulating joints 93 into sections A, B, C, etc. The length of these sections is determined in part by the physical characteristics of the railway, such as grades, curves, and the like, and according to the number of gearing combinations and different voltages used. In the particular embodiment of the invention disclosed herein, three of these sections A, B, C, etc., have a combined length equal to or exceeding the braking distance for the normal running speed. The ramp or contact rail R is divided by insulating joints 94 into control sections RA, RB, etc., corresponding in length to the track sections A, B, etc. Since the parts and wires associated with each track section are the same, corresponding parts and wires are for convenience given the same reference character with distinctive exponents added. Associated with each track section A, B, etc., is a track relay 100 which is connected across the track rails 3 and 4 in accordance with the usual practice. These track relays 100 are of the type commonly termed three-position alternating current relays. These track relays 100 are provided with a number of armatures or contact fingers 101, 102, 103 and 104 which are illustrated conventionally. Associated with each track section is a transformer T, the primary of which is connected across the line wires 9 and 10, and the secondary of which is provided with sections and intermediate taps for the purpose explained hereinafter. The wires and electrical connections between the several parts shown in Fig. 2 will not be pointed out in detail, since these electrical connections and different operative circuits will be fully set forth in the description of the operation.

It has been explained hereinbefore how the application of different voltages to a ramp section R produces the desired control of the speed of the vehicle, and in connection with the operation of the trackway circuits shown in Fig. 2, it is only necessary to point out how the voltages applied to the ramp sections of the different track sections are caused to decrease as the vehicle approaches another train in such a way as to produce the proper control of the speed of the following train.

Referring to Fig. 2, the track relays 100 of the several track sections are in practice preferably provided with local and track windings, or some other equivalent arrangement of parts, in accordance with well known practice, so that the change in the connection between the track rails of a track section and the terminals of the transformer feeding current to these track rails will cause the contact fingers of the track relay to change from one extreme position to the other, while upon total interruption of the supply of current to the track rails, the contact fingers of the corresponding track relay assume their biased or middle position. Normally, when there is no train present on any of the track sections ahead for some distance, the contact fingers of each track relay are in the lefthand position, as shown in Fig. 2 in the case of the track relays connected to the track sections B, C and F, this lefthand position of the contact fingers being conveniently termed the normal position. Upon reversal of the connection between the terminals of the track transformer and the track rails, in a manner more fully explained hereinafter, the contact fingers of the track relay connected to the track rails of that section are caused to move to the other extreme righthand position, as shown in Fig. 2 in the case of the track relay $100^2$ associated with the track section D, this other extreme or righthand position of the contact fingers being conveniently termed the reverse position. The biased or middle position of the contact fingers of each track relay 100 is conveniently termed the neutral position.

When the contact fingers of any one of the track relays 100 are in the normal position, current is supplied to the track rails of the track section next in the rear so as to cause the contact fingers of the track relay next in the rear to assume the normal position. Referring to the track relay 100 of the track section B, with the contact fingers of the track relay $100^1$ of the track section C in the normal position, the circuit for energizing the track relay 100 may be traced as follows: commencing at one terminal of the track relay 100 to the track rail 3, conductor $105^1$, contact finger $102^1$ in the normal position, conductors $106^1$ and $107^1$, secondary portion of the transformer $T^1$, conductors $108^1$ and $109^1$, contact finger $101^1$ in the normal position, conductor $110^1$ to the track rail 4 and thence to the other terminal of the track relay 100.

If the contact fingers of a track relay are in the reversed position, as shown in Fig. 2 in the case of the track relay $100^2$ of the track section D, the polarity of the connections between the track rails of the next block in the rear remains the same, although the circuit has been changed. The circuit in question in the case of the track relay $100^1$, as shown in Fig. 2, may be traced as follows: commencing at one terminal of the track relay $100^1$ to the track rail 3, conductor $105^2$, armature $102^2$ in the reverse position, conductors $111^2$, $112^2$ and $107^2$, secondary portion of the transformer $T^2$, conductors $108^2$, $113^2$ and $114^2$, contact finger $101^2$ in the reverse position, conductor $110^2$ to the track rail 4 and thence to the other terminal of the track relay $100^1$.

When a track relay 100 of a track section is shunted and its contact fingers assume the neutral position, as shown in Fig. 2 in the case of the track relay $100^3$ of the track section E, the polarity of the connections between the track transformer and the track rails of the track section, as the track section D, next in the rear is changed, so as to cause the contact fingers of the track relay, as the track relay $100^2$, of the track section next in the rear to assume the reverse position, as shown in Fig. 2. The circuit in question establishing the connection of reversed polarity may be traced as follows: commencing at one terminal of the track relay $100^2$ to the track rail 3, conductor $105^3$, contact finger $102^3$ in the neutral position, conductors $115^3$, $113^3$ and $108^3$, secondary portion of the transformer $T^3$, conductors $107^3$, $112^3$ and $116^3$, contact finger $101^3$ in the neutral position, conductor $110^3$ to the track rail 4 and thence to the other terminal of the track relay $100^2$.

From the above explanation it will be readily apparent to those skilled in the art that when a train occupies a certain track section as shown in Fig. 2 in the case of the track section E, the contact fingers of the track relay $100^3$ of that track section are in the neutral position, the contact fingers of the track relay $100^2$ of the track section next in the rear are in the reversed position, and the contact fingers of the track relays of the other track sections in the rear, provided of course that these other track sections are not occupied by other trains, are in the normal position. Assuming a train to occupy the track section E, as shown in Fig. 2, no voltage is supplied to the ramp section RD of the track section D next in the rear, since the conductor $117^3$ connected to said ramp section is disconnected from all other conductors at the contact finger $103^3$, which is in its neutral position. Thus, there is zero voltage applied to the ramp section next in the rear of the train. The voltage applied to the ramp section RC is low voltage, the circuit for establishing this low voltage being traced as follows: commencing at the ramp section RC, conductor $117^2$, contact finger $103^2$ in the reverse position, conductor $121^2$, low voltage tap of the secondary of the transformer $T^2$ and conductor $120^2$ to the track rail 3. The voltage applied to the ramp section RB is medium voltage, the circuit for applying this voltage being traced as follows: commencing at the ramp section RB, conductor $117^1$, contact finger $103^1$ in the normal position, conductor $118^1$, contact finger $104^2$ in the reverse position, conductor $122^2$, medium voltage tap of the transformer $T^2$ and conductor $120^2$ to the track rail 3. The voltage applied to the ramp section RA is high voltage, the circuit being traced as follows: commencing at the ramp section RA, conductor 117, contact finger 103 in the normal position, conductor 118, contact finger $104^1$ in the normal position, conductor $119^1$, high voltage tap of the transformer $T^1$ and conductor $120^1$ to the track rail 3.

Assuming a train to occupy the track section E as shown in Fig. 2, another following vehicle entering the track section A will find high voltage on the corresponding ramp section RA and may proceed at full speed.

When this following vehicle enters the track section B, it finds medium voltage applied to the ramp section RB. This medium voltage results in the deenergization of the solenoid 43 of the high gearing combination H, thereby resulting in the turning of the cam shaft 58 gradually so as to cause a reduction in speed in the same way as hereinbefore explained. As the following vehicle progresses and enters the track section C, assuming the forward train is still in the track section E, the low voltage applied to the ramp section RC causes a deenergization of the solenoid $43^1$ of the low gearing combination L on the following vehicle, and compels the following vehicle to reduce its speed still further. In the same way, as the vehicle passes through the track section D, assuming that the forward train still remains in the track section E, there is a still further reduction in speed of the following vehicle, which will result in the following vehicle being brought to a stop or a predetermined low speed before it reaches the end of the track section D. In case it should happen that, while the following vehicle is moving through any one of the track sections B, C or D, the forward train advances entirely into the track section F, the voltage applied to each of the ramp sections in the rear will be increased one step, the voltage on the ramp section RD being changed to low, the voltage on the ramp section RC being changed to medium, and the voltage on the ramp section RB being changed to high. As soon as this increase of one step in the voltage applied to the ramp section occurs, the solenoid 43 of the next higher gearing combination is energized, and the following vehicle permitted to increase its speed. In this way, when the forward train advances entirely from one track section to the next track section, the change in traffic conditions is immediately manifested at the following vehicle, and the following vehicle is permitted to advance correspondingly. In the case of two vehicles following one another along the track, the distance between the following vehicle and the forward vehicle is always kept great enough to permit the following vehicle to be brought to a stop by an application of its brakes before reaching the forward vehicle; and yet when circumstances require, the following vehicle may close up on the forward vehicle by reducing its speed, and upon acceleration of the forward vehicle, may correspondingly accelerate.

The particular apparatus and circuits illustrated and described have been selected for the purpose of making the principles and mode of operation of the invention more easily understood than for the purpose of showing the exact construction of parts that would be preferably used in practice; and it is apparent that various changes may be made in the particular construction and arrangement of circuits shown and described and still accomplish the functions and purposes of the invention and attain all of its advantages. Consequently, I do not wish my invention to be limited to the details of the construction and arrangement of parts and circuits illustrated and described.

What I claim as new and desire to secure by Letters Patent of the United States, is:

1. In an automatic train control system, apparatus for controlling the movement of a railway vehicle including a permissive speed device adapted to assume different controlling conditions, means controlled by the progress of the vehicle along the track for gradually varying the controlling condition of said device so as to increase or decrease the permissive speed established thereby, and impulse transmitting means comprising elements partly on the vehicle and partly along the track for governing the last mentioned means in accordance with traffic conditions.

2. In an automatic train control system, apparatus for controlling the movement of a vehicle including an element for establishing different permissive speeds for the vehicle and adapted to assume different controlling positions, means controlled by the progress of the vehicle along the track for moving said element in either direction, and means comprising elements partly along the track and partly on the vehicle for governing said last mentioned means in accordance with the extent of unoccupied track in advance of the vehicle.

3. In an automatic train control system, the combination with a railway track, of impulse transmitting means along the track responsive to the presence of a train and adapted to assume different controlling conditions at different points along the track depending on the location of the respective control points with reference to the train, a vehicle, apparatus on the vehicle for controlling the movement thereof including a permissive speed device, means on the vehicle controlled by its progress along the track for gradually varying the controlling condition of said device to either increase or decrease the permissive speed for the vehicle, and means on the vehicle governed by said impulse transmitting means along the track for governing said last mentioned means in accordance with the extent of unoccupied track in advance of the vehicle.

4. In an automatic train control system, the combination with a railway track, of impulse transmitting means along the track responsive to the presence of a train and adapted to assume different controlling conditions at different control points along the track depending on the location of the respective control points with reference to the train, a vehicle, apparatus on the vehicle for controlling the movement thereof including a permissive speed device, means on the vehicle for causing said permissive speed device to change either to higher or lower speed conditions gradually dependent on the progress of the vehicle through a plurality of successive predetermined steps, and means on the vehicle governed by said impulse transmitting means along the track for determining the extent of the change of said permissive speed device.

5. In an automatic train control system, apparatus for controlling the movement of a vehicle including an element for establishing permissive speeds for the vehicle, means operatively connected to the wheels of the vehicle and adapted to move said element in either direction gradually in accordance with the progress of the vehicle along the track, and impulse transmitting means comprising elements partly on the vehicle and partly along the track for governing said means in accordance with traffic conditions.

6. In an automatic train control system, apparatus for controlling the movement of a vehicle including an element for establishing permissive speeds for the vehicle, gearing operatively connected to the wheels of the vehicle and adapted to be connected to the element to move it in either direction gradually in accordance with the progress of the vehicle along the track, means for controlling said gearing to determine the direction of movement to be given to said element, and traffic controlled means for governing said last mentioned means.

7. In an automatic train control system, apparatus for controlling the movement of a vehicle including an element for establishing permissive speeds for the vehicle, gearing combinations operatively connected to the wheels of the vehicle for changing the controlling condition of said element through successive ranges to either increase or decrease the permissive speed, and traffic controlled means partly on the vehicle and partly along the track for selectively controlling said gearing combinations.

8. In an automatic train control system, the combination with a railway track, of traffic controlled impulse devices along the track adapted to assume different controlling conditions at different control points in accordance with the extent of unoccupied track in advance of the respective control points, apparatus on the vehicle for controlling the movement thereof including a permissive speed device, said permissive speed device having predetermined controlling conditions corresponding to the different controlling conditions of the impulse devices along the track, and means on the vehicle for causing said permissive speed device to change gradually from one controlling condition to either a higher or a lower speed condition in accordance with the progress of the vehicle between said control points.

9. In an automatic train control system, the combination with a track divided into track circuit sections each having a polarized track relay, of means controlled by each track relay for controlling the polarity of the track circuit of the track section next in the rear, impulse transmitting means associated with each track section and adapted to assume a plurality of different controlling conditions under the influence of different voltages applied thereto, sources of current of different voltages, and controlling circuits for each impulse transmitting means governed by the track relays of the plurality of track sections in advance thereof, said controlling circuits of each impulse transmitting means determining the controlling condition thereof in accordance with the number of unoccupied track sections in advance.

10. In an automatic train control system, automatic train control apparatus on a vehicle including a movable element for establishing permissive speeds, reversible gearing for operatively connecting said element to the wheels of the vehicle and adapted to drive said element in either direction, and traffic controlled means partly on the vehicle and partly along the track for controlling said gearing.

11. In an automatic train control system, automatic train control apparatus on a vehicle including a movable element for establishing permissive speeds, a plurality of gearing combinations for driving said elements, each of said gearing combinations being adapted to drive the element in either direction, and means for determining the gearing combination to be effective, and the direction of movement given to said element by that gearing combination.

12. In an automatic train control system, automatic train control apparatus for a railway vehicle including a movable permissive speed device, gearing connected to the wheels of the vehicle for moving said permissive speed device, a control means on the vehicle adapted when changed from normal to cause the permissive speed device to be moved towards its lower speed positions to an extent dependent on the character of the change, impulse transmitting means partly on the vehicle and partly along the track and adapted to change the control means at any point in the travel of the vehicle, said impulse transmitting means including a plurality of track sections for each braking distance, and track circuits for governing said impulse transmitting means to cause the control means to assume a changed position when the vehicle approaches within a predetermined distance from another vehicle ahead.

13. In an automatic train control system, automatic train control apparatus for a railway vehicle including a movable permissive speed device, gearing on the vehicle adapted to move said device through any one of a plurality of successive ranges of movement in accordance with the progress of the vehicle along the track, said gearing also acting to hold the permissive speed device stationary at the end of any one of its ranges of movement, a brake setting appliance on the vehicle, a warning signal on the vehicle, a speed responsive device governed by the speed of the vehicle, means controlled jointly by the permissive speed device and the speed responsive device for causing operation of the warning signal and the brake setting appliance in succession with an intervening interval of delay whenever the actual speed of the vehicle exceeds the prescribed permissive speed, and means partly on the track and partly on the vehicle for governing the operation of said gearing and acting to vary the range of movement of the permissive speed device in accordance with the distance between the vehicle and another vehicle ahead.

14. In an automatic train control system, the combination with a track divided into sections several of which constitute braking distance for the vehicles traveling over the track, of automatic train control apparatus on a vehicle including a permissive speed device, control means on the vehicle operable to cause the permissive speed device to change gradually toward either higher or lower speed conditions through a plurality of predetermined ranges during the progress of the vehicle through a corresponding track section dependent on traffic conditions in advance, said control means also being capable of maintaining the permissive speed device in any one of its various changed conditions at the extremes of said ranges of change, and means partly on the vehicle and partly along the track for governing the operation of said control means in accordance with the number of unoccupied track sections in advance of the vehicle.

15. In an automatic train control system, automatic train control apparatus on the vehicle including a changeable permissive speed device adapted to establish varying permissive speeds for the vehicle, means for causing the permissive speed device to change gradually in accordance with the progress of the vehicle along the track and thereby establish higher permissive speeds, and traffic controlled means partly on the vehicle and partly along the track for governing the operation of said means.

16. In an automatic train control system, automatic train control apparatus on a railway vehicle including a changeable permissive speed device adapted to establish varying permissive speeds for the vehicle, means operatively connected to the wheels of the vehicle for causing the permissive speed device to change to varying extents towards higher or lower speed conditions in accordance with the progress of the vehicle along the track, and traffic controlled means partly on the vehicle and partly along the track for governing said means and acting to determine the extent and direction of change of the permissive speed device.

17. In an automatic train control system, automatic train control apparatus on a railway vehicle including a changeable permissive speed device adapted to establish varying permissive speeds for the vehicle, operating means for the permissive speed device adapted to cause it to change either to increase or decrease the permissive speeds, control means for said operating means adapted to select the extent and direction of such change, said control means being biased to cause the permissive speed device to change towards lower permissive speeds, and traffic controlled means partly on the vehicle and partly along the track for influencing said control means in opposition to its bias to a variable degree dependent upon the extent of unoccupied track in advance of the vehicle.

18. In an automatic train control system, automatic train control apparatus for a railway vehicle including a changeable permissive speed device, gearing on the vehicle adapted to regulate the change of the permissive speed device in accordance with the progress of the vehicle along the track, a brake setting appliance on the vehicle, a warning signal on the vehicle, a speed responsive device governed by the speed of the vehicle, means controlled jointly by the permissive speed device and the speed responsive device for operating said warning signal and said brake setting appliance in succession with an intervening interval of delay whenever the actual speed of the vehicle exceeds the prescribed permissive speed, and means partly on the vehicle and partly along the track for governing the operation of said gearing and acting to vary the extent of change of the permissive speed device, the trackway portion of said last mentioned means consisting of a plurality of influence communicating sections for each braking distance of the train each of which communicates with the vehicle carried portion of said means during the entire time the vehicle moves in such section and controls the permissive speed device in accordance with the extent of unoccupied track ahead.

19. In an automatic train control system, automatic train control apparatus for a railway vehicle including a movable permissive speed cam, gearing connected to the wheels of the vehicle for moving said cam, control means on the vehicle for the gearing adapted to respond to different voltages and to cause movement of the cam to a corresponding extent, and traffic controlled means partly on the vehicle and partly along the track for supplying different voltages to said control means in accordance with the extent of unoccupied track in advance of the vehicle.

20. In a speed control system for railway vehicles, a track, a vehicle thereon, a permissible speed device on the vehicle, adapted to be set in a maximum speed position, a minimum speed position, and a plurality of sub-maximum speed positions, continuous means along the trackway for actuating said permissible speed device to move it to various positions, and means for moving said permissible speed device in accordance with the distance traveled by the vehicle, when said device has been actuated by the means along the trackway to move from a given permissible speed position to a lower permissible speed position.

21. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous means along the trackway for actuating said permissible speed device to move it to various positions, means for moving said permissible speed device in accordance with the distance traveled by the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

22. In a speed control system for railway vehicles, a track, a vehicle thereon, a permissible speed device on the vehicle, adapted to be set in a maximum speed position, a minimum speed position, and a plurality of sub-maximum speed positions, continuous means along the trackway for actuating said permissible speed device to move it to various positions, and means on the vehicle for driving said permissible speed device from the wheels of the vehicle, when said device has been actuated by the means along the trackway to move from a given permissible speed position to a lower permissible speed position.

23. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous means along the trackway for actuating said permissible speed device to move it to various positions, means on the vehicle for driving said permissible speed device from the wheels of the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

24. In a speed control system for railway vehicles, a track, a vehicle thereon, a permissible speed device on the vehicle, adapted to be set in a maximum speed position, a minimum speed position, and a plurality of submaximum speed positions, continuous means along the trackway for actuating said permissible speed device to move it to various positions, means including said means along the trackway for moving said permissible speed device, when said device has been actuated by the means along the trackway to move from a given permissible speed position to a higher permissible speed position, and means on the vehicle for moving said permissible speed device in accordance with the distance traveled by the vehicle, when said device has been actuated by the means along the trackway to move from a given permissible speed position to a lower permissible speed position.

25. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous means along the trackway for actuating said permissible speed device to move it to various positions, means including said means along the trackway for moving said permissible speed device, when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

26. In a speed control system for railway vehicles, a track, a vehicle thereon, a permissible speed device on the vehicle, adapted to be set in a maximum speed position, a minimum speed position, and a plurality of submaximum speed positions, continuous means along the trackway for actuating said permissible speed device to move it to various positions, means including said means along the trackway for moving said permissible speed device, when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, and means including the means along the trackway for maintaining the permissible speed device in the position to which it has been moved.

27. In a speed control system for railway vehicles, a track, a vehicle thereon, a permissible speed device on the vehicle adapted to be set in a maximum speed position, a minimum speed position, and a plurality of submaximum speed positions, an actual speed device on the vehicle, continuous means along the trackway for actuating said permissible speed device to move it to various positions, means including said means along the trackway for moving said permissible speed device when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, means including the means along the trackway for maintaining the permissible speed device in the position to which it has been moved, means for retarding the vehicle, and means for actuating the retarding means when actual speed of the vehicle exceeds the permissible speed corresponding to the position of the permissible speed device.

28. In a speed control system for railway vehicles, a trackway divided into blocks, a continuous third rail along the trackway, divided into sections corresponding to the blocks, means responsive to the presence of a vehicle in any block for producing different electrical conditions in the third rail sections in the rear thereof, a permissible speed device on a following vehicle adapted to be set in a maximum speed position, a minimum speed position, and a plurality of submaximum speed positions, means including the third rail sections to actuate the permissible speed device to move to a lower permissible speed position as the said vehicle approaches close to the first vehicle, and means for moving the said permissible speed device in accordance with the distance traveled by the said vehicle.

29. In an automatic train control system, the combination with a permissive speed device on a vehicle automatically determining the limiting speed at which the vehicle may travel without an automatic application of its brakes, said permissive speed device being maintained in a maximum or an intermediate speed condition by energy of a corresponding distinctive character continuously communicated thereto from the trackway and automatically assuming its minimum speed condition whenever such energy is not communicated thereto, said permissive speed device including means operatively connected to the wheels of the vehicle and causing a gradual change in said device from any one of its permissive speed conditions to lower speed conditions, and means including continuous conductors along the trackway and a source of alternating current for supplying energy to said permissive speed means on a vehicle at all points in its travel of a distinctive character in accordance with traffic conditions.

30. In an automatic train control system, the combination with car-carried apparatus comprising an automatic brake-setting appliance, a speed responsive device determining the actual speed of the vehicle, a permissive speed device, and means actuating the brake-setting appliance whenever the actual speed of the vehicle exceeds that prescribed by the permissive speed device, control means for said permissive speed device including contacts selectively opened and closed in response to distinctive influences communicated to the control means from the trackway, said control means causing the permissive speed device to assume a maximum or intermediate or minimum speed condition in conformity with character of distinctive influence communicated thereto, of trackway means including continuous conductors and a source of alternating current for communicating influences of distinctive character to said control means on a passing car at all points in its travel in accordance with the presence or absence of other vehicles ahead.

31. In an automatic train control system, the combination with car-carried apparatus comprising an automatic brake-setting appliance, a speed responsive device determining the actual speed of the vehicle, a permissive speed device, and means actuating the brake-setting appliance whenever the actual speed of the vehicle exceeds that prescribed by the permissive speed device, means responsive differently to influences of distinctive characters communicated thereto from the trackway for governing the speed condition of said permissive speed device, said control means acting to cause said permissive speed device to change gradually in accordance with the distance traveled by the car from a speed condition to a lower speed condition in conformity with the character of the control influence changes, of trackway means for continuously communicating to the control means on a car at all points in its travel a control influence of a character varying with traffic conditions ahead and the location of the car.

32. In an automatic train control system, trackway means including continuous conductors automatically responsive to the presence of a train for communicating to a following vehicle different points in the rear distinctive control influences, and automatic brake control apparatus on a vehicle including a changeable permissive speed device determining the speed limit at which the vehicle may travel without an automatic brake application, said apparatus being selectively responsive to the character of said control influences and automatically causing said permissive speed device to assume successively lower speed conditions in conformity with the character of influence communicated from the trackway as the vehicle approaches another train ahead, said permissive speed device changing to its lower speed conditions after a limited distance of travel following the corresponding change in the controlling influence.

33. An automatic train control system comprising, a railway vehicle, an electro-responsive device on said vehicle, trackway conductors connected to a source of traffic controlled energy which are bridged by a conducting path including part of a passing vehicle, said conductors continuously transmitting control influences of distinctive characters to said electro-responsive device on said vehicle dependent on the extent of unoccupied track ahead; and automatic means on the vehicle for enforcing varying safe speed limits as it approaches another train ahead, said means including a permissive speed device changing gradually to lower speed conditions in conformity with the response of said electro-responsive device to the character of control influence communicated thereto from the trackway, an actual speed device, and automatic brake applying mechanism actuated whenever the actual speed of the vehicle exceeds that prescribed by the existing speed condition of said permissive speed device.

34. An automatic train control system for railways comprising, a changeable permissive speed device on a vehicle adapted to assume a maximum or a minimum or an intermediate speed condition and having a tendency to assume its minimum speed condition unless restrained by external influences, means for continuously transmitting energy to the permissive speed means of a distinctive character depending upon the existence of danger ahead and the location of the vehicle with respect to the point of danger, said permissive speed means being maintained in its maximum or its intermediate speed condition depending upon which character of energy is transmitted and automatically changing to a lower speed condition upon failure of the reception of energy of a corresponding character, said permissive speed device changing gradually from any speed condition to a lower speed condition after an interval of time varying in accordance with the speed.

35. In an automatic train control system, the combination with car-carried apparatus comprising a permissive speed device, an actual speed device, a brake-setting appliance, means for actuating said brake-setting appliance if the actual speed exceeds the permissive speed prescribed by the permissive speed device, means for maintaining said permissive speed device in a maximum or in an intermediate speed condition by energy transmitted from the trackway depending on the character of said energy, said permissive speed device changing gradually to a lower speed condition upon failure of reception of such energy and being restored to the maximum or to the intermediate speed condition upon subsequent return of such energy depending on the character thereof, of means along the trackway for continuously transmitting energy of different characters to the car-carried apparatus in accordance with traffic conditions ahead.

36. Car-carried apparatus for automatic train control systems comprising, a brake-setting appliance, an actual speed device, a permissive speed device changeable to a maximum or an intermediate or a minimum speed condition, means for actuating the brake-setting appliance whenever the actual speed of the vehicle exceeds that prescribed by the permissive speed device, control means responsive to influences of different character communicated thereto from the trackway for governing the changes of said permissive speed device, and means having its operation governed by said control means for gradually changing the permissive speed device from a given speed condition to the next lower speed condition in conformity with a corresponding change in the character of the influence communicated, for maintaining the permissive speed device in such lower speed condition so long as the particular changed character of influence continues, and for restoring the permissive speed device to a corresponding higher speed condition upon change in the character of said influence.

37. In an automatic train control system, means partly on a vehicle and partly on the trackway for continuously communicating to the vehicle at all points in its travel influences of distinctive characters dependent on traffic conditions ahead, automatic brake applying apparatus on the vehicle governed by said influences and including a changeable permissive speed device adapted to determine the limiting speed at which the vehicle may travel without an automatic application of the brakes, said apparatus acting automatically upon change in the character of influence received from the trackway to cause said permissive speed device to change in accordance with the progress of the vehicle to a certain condition corresponding to the character of the influence then being received and to remain in such condition while such changed character of influence continues, after which the permissive speed device may again change in accordance with the progress of the vehicle to a condition corresponding to a further change in the character of the influence then being received.

CHARLES F. ESTWICK.